W. Hall, Jr.
Rock-Drill Chuck.

Nº 80,406.        Patented July 28, 1868.

Witnesses:
S. B. Kidder
M. W. Frothingham

Inventor.
Wm. Hall Jr.

United States Patent Office.

WILLIAM HALL, JR., OF NORTH ADAMS, MASSACHUSETTS.

*Letters Patent No. 80,406, dated July 28, 1868.*

IMPROVEMENT IN DRILL-HOLDERS.

*The Schedule referred to in these Letters Patent and making part of the same.*

TO ALL WHOM IT MAY CONCERN:

Be it known that I, WILLIAM HALL, Jr., of North Adams, in the county of Berkshire, and State of Massachusetts, have invented an Improved Drill-Holder; and I do hereby declare that the following, taken in connection with the drawings which accompany and form part of this specification, is a description of my invention sufficient to enable those skilled in the art to practise it.

In rock-drills, much difficulty is experienced in holding the drill securely in the drill-spindle, and at the same time in such a way that the drill can be detached readily for sharpening.

The violent and rapid concussions received by drills used in machines operated directly by steam, cause most holders of such drills to fail in some particular in a very short period of practical operation, and to remedy such failures is the object of my invention.

Figure 1:
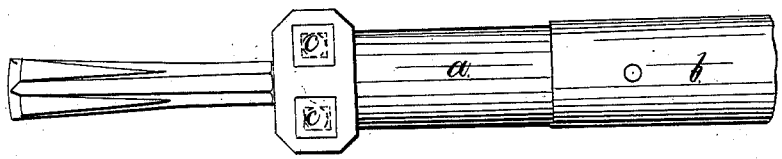
Figure 2:
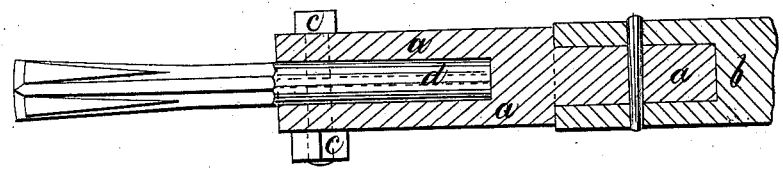
Figure 3:
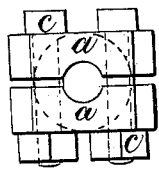

A drill-holder made in accordance with my invention is shown in side elevation in Figure 1, in central longitudinal section in Figure 2, and in end elevation in Figure 3.

The holder, $a$, is a short piece of steel fitted into the end of the piston-rod $b$ of a steam-drilling machine, the salient end of the holder being enlarged to receive the screw-bolts $c\ c$. The holder, $a$, is drilled axially from its salient end with a hole of the diameter of the shank $d$ of the drill, and then the holder is slotted entirely through across its central plane, the faces of the slot being parallel with the faces of the holder, upon which the heads and nuts of the bolts $c\ c$ bear.

The removal of the material of the holder $a$, in making the slot described, converts the bifurcated parts of the holder into stiff springs, which can be drawn toward each other by turning the nuts on the bolts $c\ c$, so as thereby to gripe the drill-shank very powerfully, while at the same time the nuts may be easily and quickly turned by a wrench, releasing the drill by the spring of the bifurcated parts of the holder from gripe, so that it can be removed for sharpening, or to be interchanged for another drill.

The end of the drill-shank should be brought against the termination of the shank-hole in the holder, so that no yield of the drill can take place in the direction of its length consequent upon the blow given by the drill-point.

It is evident that a drill-holder made as mine, and held together by bolts and nuts, is more reliable than those in which a screw-threaded or smooth-bored conical sleeve is employed to surround a conical portion of the holder, inasmuch as the bolts and nuts will retain their places with far greater certainty under the shocks to which the implement is subjected.

I claim the drill-holder, made substantially as described, not only with a longitudinal shank-bore, and with a slot extending about the length of the bore, but with the faces of the slot parallel with the surfaces of the holder on which the heads and nuts of the bolts $c\ c$ bear.

WILLIAM HALL, JR.

Witnesses:
  H. A. WILEY,
  C. BURLEIGH.